United States Patent
Ryu et al.

(10) Patent No.: US 11,295,631 B2
(45) Date of Patent: Apr. 5, 2022

(54) CHARACTER AND SHAPE PRESENTATION DEVICE

(71) Applicant: GWANGJU INSTITUTE OF SCIENCE AND TECHNOLOGY, Gwangju (KR)

(72) Inventors: Jeha Ryu, Gwangju (KR); Youngho Kim, Gwangju (KR); Baekdong Cha, Gwangju (KR); Yoonjeong Choi, Gwangju (KR); Kyoungjae Jin, Gwangju (KR)

(73) Assignee: GWANGJU INSTITUTE OF SCIENCE AND TECHNOLOGY, Gwangju (KR)

(*) Notice: Subject to any disclaimer, the term of this patent is extended or adjusted under 35 U.S.C. 154(b) by 272 days.

(21) Appl. No.: 16/399,962

(22) Filed: Apr. 30, 2019

(65) Prior Publication Data
US 2020/0349861 A1 Nov. 5, 2020

(51) Int. Cl.
*G09B 21/00* (2006.01)
*G06F 3/02* (2006.01)
*G06F 3/01* (2006.01)
*G06F 3/00* (2006.01)

(52) U.S. Cl.
CPC ........... *G09B 21/003* (2013.01); *G06F 3/005* (2013.01); *G06F 3/016* (2013.01); *G06F 3/02* (2013.01)

(58) Field of Classification Search
CPC .................................................. G09B 21/003
See application file for complete search history.

(56) References Cited

U.S. PATENT DOCUMENTS

| | | | | |
|---|---|---|---|---|
| 4,500,293 A | * | 2/1985 | Eltgen | G09B 21/003 340/407.1 |
| 5,823,691 A | * | 10/1998 | Langner | G09B 21/02 400/127 |
| 6,109,922 A | * | 8/2000 | Litschel | G09B 21/004 340/4.12 |
| 6,776,619 B1 | * | 8/2004 | Roberts | G09B 21/001 340/4.12 |
| 7,651,454 B2 | * | 1/2010 | Reymond | B41F 19/062 493/321 |
| 7,744,372 B1 | * | 6/2010 | Minnich | G09B 21/02 434/113 |

(Continued)

FOREIGN PATENT DOCUMENTS

JP 2005352258 A 12/2005

OTHER PUBLICATIONS

Klaus Miesenberger, Jul. 11-13, 2018, Computers Helping People with Special Needs, Springer, pp. 1-585 (Year: 2018).*

(Continued)

*Primary Examiner* — Justin S Lee
(74) *Attorney, Agent, or Firm* — Loza & Loza, LLP; Heidi Eisenhut

(57) ABSTRACT

Disclosed is a character and shape presentation device, more specifically, an electro-vibrating device including a zoned electro-vibrating panel. The electro-vibrating device includes a motor for generating rotational power; a rotation unit rotated by the rotational power generated by the motor and provided in shape of a cylinder; and an electro-vibrating panel anodized on a face of the rotation unit to provide different tactile sensation patterns to a user.

17 Claims, 4 Drawing Sheets

(56) References Cited

U.S. PATENT DOCUMENTS

| | | | | |
|---|---|---|---|---|
| 8,600,580 B2* | 12/2013 | Fisher | ............ | B60B 19/04 |
| | | | | 701/2 |
| 10,121,335 B2* | 11/2018 | Deokar | ............ | G09B 21/004 |
| 10,276,066 B2* | 4/2019 | Azamfar | ............ | G09B 21/004 |
| 2002/0045151 A1* | 4/2002 | Roberts | ............ | G09B 21/001 |
| | | | | 434/113 |
| 2008/0227060 A1* | 9/2008 | Esashi | ............ | G09B 21/007 |
| | | | | 434/113 |
| 2010/0003646 A1* | 1/2010 | Tapscott | ............ | G09B 21/02 |
| | | | | 434/113 |
| 2011/0216006 A1* | 9/2011 | Litschel | ............ | G09B 21/003 |
| | | | | 345/168 |
| 2012/0236134 A1* | 9/2012 | Keyes | ............ | G06K 9/228 |
| | | | | 348/62 |
| 2013/0194366 A1* | 8/2013 | Chretien | ............ | B41J 2/0057 |
| | | | | 347/102 |
| 2013/0203022 A1* | 8/2013 | Al-Qudsi | ............ | G09B 21/004 |
| | | | | 434/113 |
| 2015/0310762 A1* | 10/2015 | Seim | ............ | G09B 15/00 |
| | | | | 434/113 |
| 2017/0287359 A1* | 10/2017 | Azamfar | ............ | G09B 21/004 |
| 2018/0096631 A1* | 4/2018 | Alanis | ............ | G09B 21/004 |
| 2018/0268670 A1* | 9/2018 | Gabbay | ............ | A61F 9/08 |
| 2019/0347944 A1* | 11/2019 | Treml | ............ | G09B 1/18 |
| 2020/0219415 A1* | 7/2020 | Johnson | ............ | G09B 21/02 |

OTHER PUBLICATIONS

A. Puertas, Braille line using electrical stimulation, 2007, Journal of Physics, pp. 1-8 (Year: 2007).*

Zhiming Liu, Finger-Eye: A Wearable Text Reading Assistive System for the Blind and Visually Impaired, Jun. 6-9, 2016, IEEE International Conference, pp. 1-6 (Year: 2016).*

Bau et al. "Teslatouch: Electrovibration for touch surfaces." UIST '10: Proceedings of the 23nd annual ACM symposium on User interface software and technology (pp. 283-292) Oct. 2010.

* cited by examiner

SECTION A-A

CHARACTER AND SHAPE PRESENTATION DEVICE

BACKGROUND

1. Field

The present disclosure relates to a character and shape presentation device. More specifically, the present disclosure relates to an electro-vibrating device including a zoned electro-vibrating panel.

2. Description of Related Art

Visually impaired people use braille when reading a text or recognizing an object. Braille differs slightly from country to country. However, basically, the braille employs unevenness defined according to a predefined letter format. In recent years, braille books and braille displays for the visually impaired have been developed. These products offer more opportunities for the visually impaired.

However, it takes a lot of time to print braille books. Further, there is a problem that the Braille book is too heavy to carry. To solve this problem, a device has been developed to implement various combinations of braille by mechanically raising and lowering a pin array. Further, a device has been developed that presents braille via electrical stimulation on a touch panel.

These devices has problem. For example, the pin array approach has poor portability and recognition (the visually impaired more accurately perceives the object via slip thereon). Further, it is difficult to miniaturize and integrate the pin array based device. In general, the pin array approach may implement braille by vertical movement of pins using a solenoid as an actuator. This approach requires a large scale system, requires a high voltage, and has a complicated structure.

The touch screen based approach presents braille by applying electrical stimulation to the user using the touch screen. In this approach, in order to recognize braille in a compartmentalized panel, it is necessary for the visually impaired to read braille in a specific direction. Braille recognition is implemented by matching a specific sense to each point, resulting in poor readability and in increased complexity compared to the existing systems. The touch panel based device has large weight and size. Thus, the device should be placed on a desk for use.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

A purpose of the present disclosure is to provide an electro-vibrating device presenting a character and shape continuously in a braille manner to a user while the user needs not moving a finger.

Further, another purpose of the present disclosure is to provide a character and shape presentation device in which a panel for applying a stimulus to the user is zoned so that multiple different characters and shapes are presented at the same time.

In one aspect, an electro-vibrating device includes a motor for generating rotational power; a rotation unit rotated by the rotational power generated by the motor and provided in shape of a cylinder; and an electro-vibrating panel anodized on a face of the rotation unit to provide different tactile sensation patterns to a user.

In accordance with the present disclosure, the electro-vibrating device may be realized which presents a character and shape continuously in a braille manner to a user while the user needs not moving a finger.

Further, in accordance with the present disclosure, the character and shape presentation device may be realized in which a panel for applying a stimulus to the user is zoned so that multiple different characters and shapes are presented at the same time.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTIONS

Figure 1:
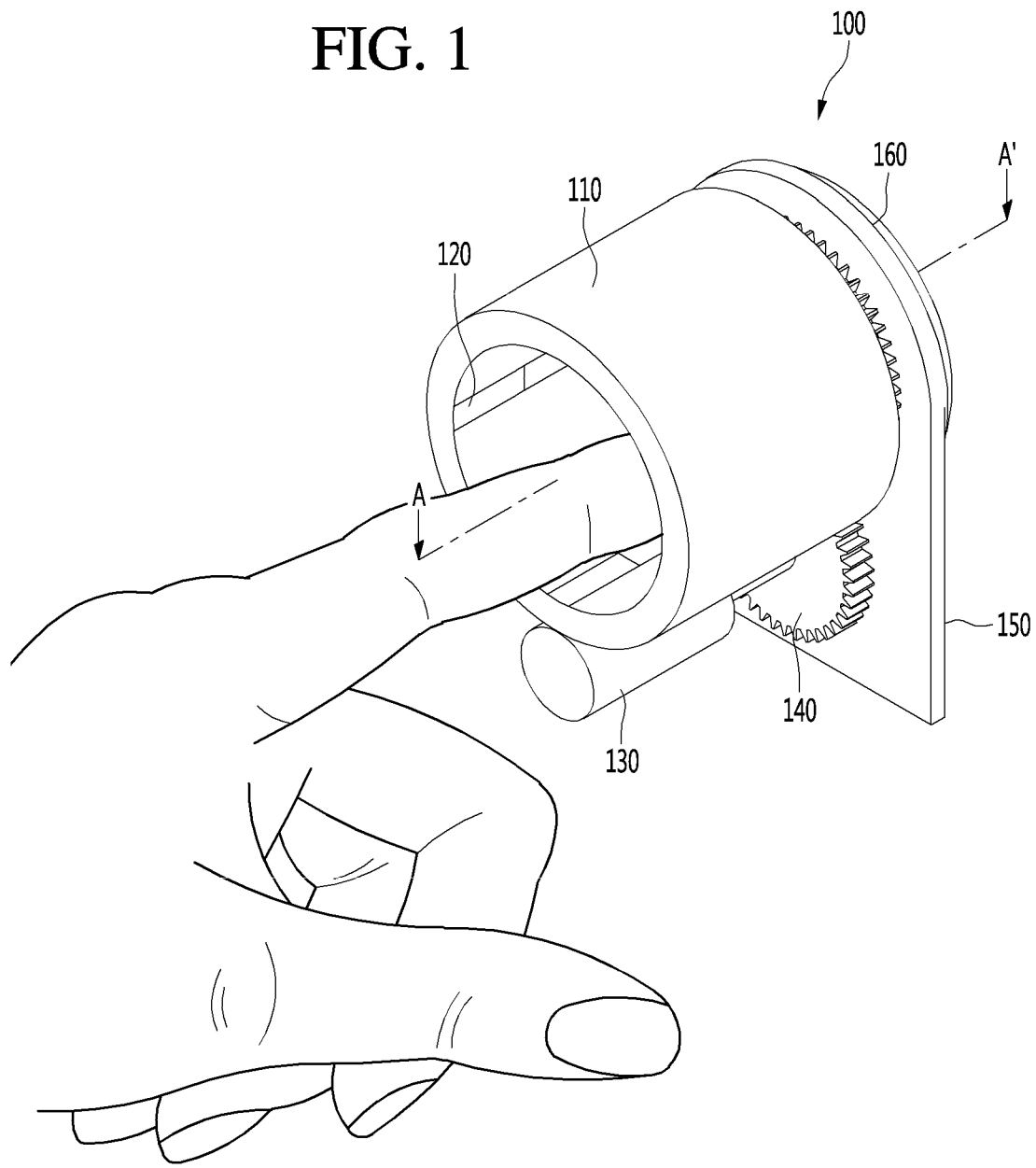
FIG. 1 shows an electro-vibrating device according to one embodiment of the present disclosure.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure provides an electro-vibrating device presenting a character and shape continuously in a braille manner to a user while the user needs not moving a finger. Further, the present disclosure provides a character and shape presentation device in which a panel for applying a stimulus to the user is zoned so that multiple different characters and shapes are presented at the same time.

To this end, braille may be implemented using electro-vibration (EV). An electro-vibrating display to implement braille defines an inner face of the character and shape presentation device. The electro-vibrating display is divided into a braille based display and an image rendering based display.

A conventional electro-vibrating display generally has a single electrode panel structure. Thus, it was not possible to apply different stimuli to different zones in the panel, thus making it difficult to simultaneously provide two Braille senses to the user.

However, in accordance with the present disclosure as described below, a novel electro-vibrating display may be zoned to apply two or more electrical stimuli to the user. This novel feature allows the present device to be used for applications that require simultaneous stimulations. Thus, all braille combinations may be presented on a surface of the present device in contact with the hand of the user.

In the electro-vibrating display based on image rendering, most of electro-vibrating panels are flat. Thus, this type of the display is only used when the display is fixed onto a support. This type of the display is inadequate for application to a wearable device, and requires an excessive area.

However, the present disclosure, which will be described in detail below, provides a curved electro-vibrating display which may be driven using a motor to provide continuous stimulation to the user even when the user does not move his/her finger. Thus, an electro-vibrating device having the curved electro-vibrating display according to one embodiment of the present disclosure may apply stimulation to the user on the electro-vibrating display so that a wearer thereof may feel an image taken by a camera.

FIG. 1 shows an electro-vibrating device according to one embodiment of the present disclosure.

As shown in FIG. 1, an electro-vibrating device 100 according to an embodiment of the present disclosure includes a rotation unit 110, an electro-vibrating panel 120, a motor 130, a power transmission 140, a frame 150, and a camera 160. Further, the electro-vibrating device 100 according to one embodiment of the present disclosure may further include a power supply (not shown) that provides power to the motor 130 or a controller (not shown) that controls all operations of the electro-vibrating device 100.

The rotation unit 110 has a cylindrical shape and is connected via the power transmission 140 to the motor 130 as shown in FIG. 1. The rotation unit 110 rotates upon reception of a driving force from the motor. In one embodiment, the rotation unit 110 has a hollow shape as shown in FIG. 1. The electro-vibrating panel 120 may be disposed on an inner face of the rotation unit 110.

As the rotation unit 110 rotates, the electro-vibrating device 100 according to one embodiment of the present disclosure may apply continuous stimulation to the user. In a conventional braille approach, a user should continue moving his/her hand to read the braille. However, in accordance with the present disclosure, the rotation unit 110 may rotate to apply a continuous stimulus (e.g., braille) to the user without requiring the user to move a finger.

In another embodiment, the rotation unit 110 may translate vertically or horizontally while rotating around a rotation axis.

The electro-vibrating panel 120 may modulate a frequency, a waveform, and a magnitude of an applied current thereto to apply various tactile sensations to a user. The user may receive various tactile sensations from the electro-vibrating panel 120 on his or her fingers.

Specifically, a conductor (not shown) included in an electro-vibrating panel may serve as a capacitor, and a human body may serve as a resistor and a capacitor. An electric force is applied between the capacitors according to the frequency, the waveform, and the magnitude of the current applied to the electro-vibrating panel 120. Thus, the electric force acts as a force to deform a surface of the electro-vibrating panel, so that various tactile sensations can be applied to the user.

The electro-vibrating panel 120 according to one embodiment of the present disclosure may be zoned to independently apply stimulation to the user on a zone basis. Accordingly, the electro-vibrating panel 120 in accordance with the present disclosure may simultaneously apply a plurality of different stimuli to the user. For example, the electro-vibrating panel 120 is segmented into three zones. The three zones may generate and apply different stimuli to the user.

Accordingly, the electro-vibrating device 100 according to an embodiment of the present disclosure may present a plurality of text lines to the user at one time when applying braille text to the user.

In one embodiment of the present disclosure, the electro-vibrating panel 120 may be implemented by anodizing only a portion of the inner face of the rotation unit 110, as shown in FIG. 1. In other embodiments, the entirety of the inner face of the rotation unit 110 may be anodized. In this connection, a plurality of the anodized portions may be defined on the inner face of the rotation unit 110.

The motor 130 generates power for the rotation of the rotation unit 110. The motor may convert electrical energy into kinetic energy and deliver the kinetic energy to the rotation unit 110. In FIG. 1, the motor 130 is disposed at a bottom of the rotation unit 110. However, this is only an example. A position of the motor 130 is not limited to that of the embodiment of FIG. 1.

The power transmission 140 delivers power generated by the motor 130 to the rotation unit 110. The power transmission 140 may be of a gear type as in the embodiment shown in FIG. 1. In other embodiments, the power transmission 140 may be of a belt type. The power transmission 140 may have any configuration capable of transmitting the rotational force generated by the motor 130 to the rotation unit 110. In an alternative, the rotation unit 110 and the motor 130 may be directly connected to each other. In this case, power transmission 140 may be absent.

The frame 150 constitutes a body onto which the components included in the electro-vibrating device 100 are mounted. A shape of the frame 150 as shown in FIG. 1 is only an example, and may vary based on a choice. In one example, the frame 150 may be a portion of a terminal device equipped with the electro-vibrating device. The terminal device may be, for example, a wearable device or a smart phone. In another example, the frame 150 may be a portion of a member to which the electro-vibrating device 100 is attached. In this case, the member may be a portion of a shelf.

The camera 160 captures an image and transmits the captured image to the controller (not shown). The controller may generate an electro-vibrating signal based on the image acquired from the camera 160. For example, when the controller acquires a text image from the camera 160, the controller may extract a text from the text image and generate an electro-vibrating signal for presenting the braille corresponding to the extracted text.

In another embodiment, when the controller acquires a image of a scene in front of the user from the camera, the controller may generate an electro-vibrating signal to present a braille corresponding to a text that describes the image. For example, a wearer of the present device may not be aware of an obstacle three meters spaced from the user and in front of the user. In this case, the controller may generate an electro-vibrating signal corresponding to a braille to indicate that there is the obstacle three meters spaced from the user and in front of the user.

Figure 2:
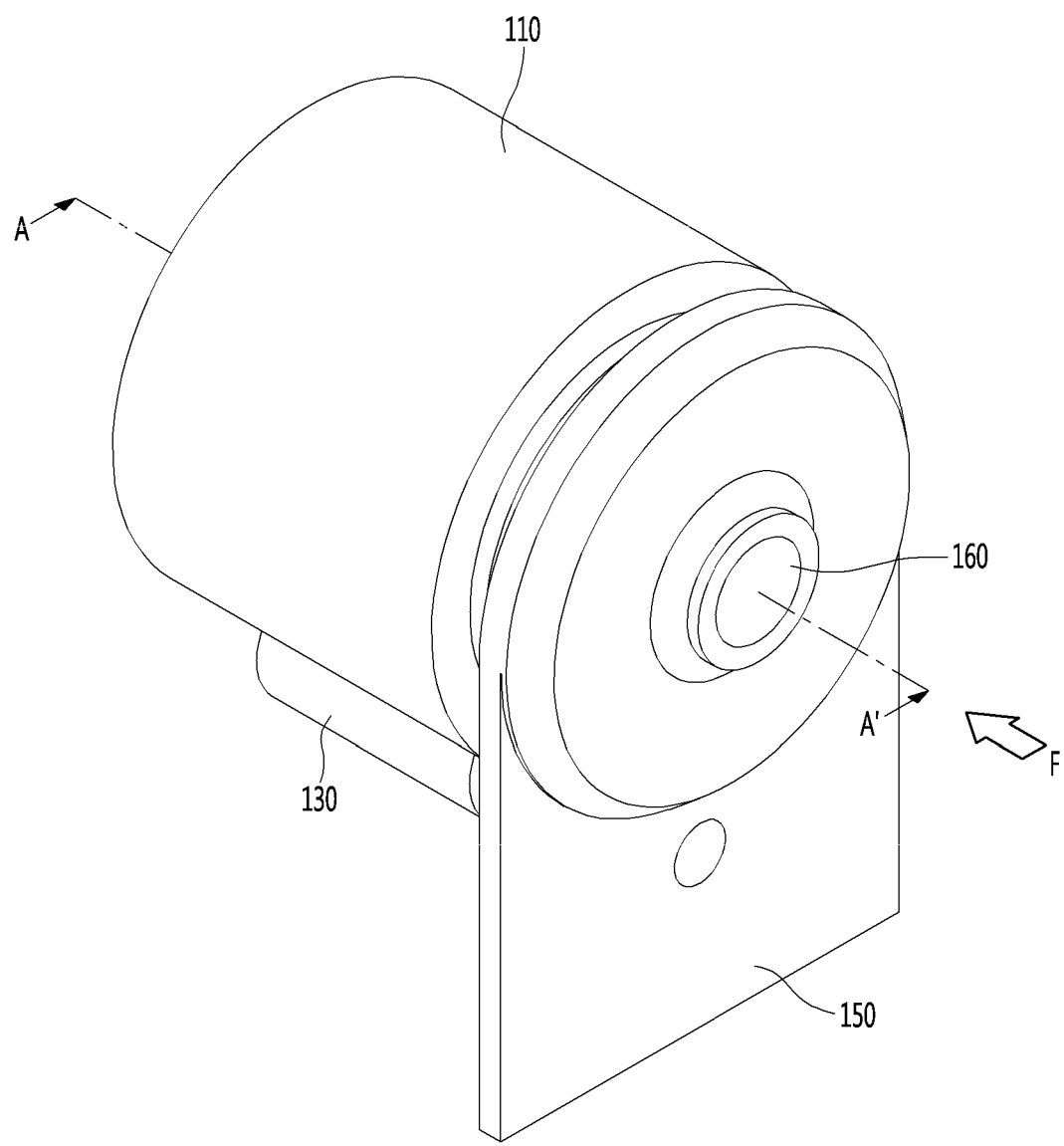
FIG. 2 shows the electro-vibrating device shown in FIG. 1 as seen in an opposite direction (F direction, hereinafter referred to as 'front direction') to that in FIG. 1.

FIG. 2 shows the electro-vibrating device shown in FIG. 1 as seen in an opposite direction (F direction, hereinafter referred to as 'front direction') to that in FIG. 1.

As shown in FIG. 2, the camera 160 described with reference to FIG. 1 may be disposed on a front face of the electro-vibrating device 100. The camera 160 does not rotate but is fixed and captures an image.

Generally, the camera captures an image in a direction opposite to a direction in which a finger is inserted, and thus the controller generates an electro-vibrating signal corresponding to the image. Accordingly, it is preferable that the camera 160 is located to photograph a scene in front of the electro-vibrating device 100, as shown in FIG. 2.

Further, as shown in FIG. 2, the camera 160 is disposed on the frame 150. However, this is only an example. The camera 160 may be disposed on a component other than the frame 150 as needed.

Figure 3:
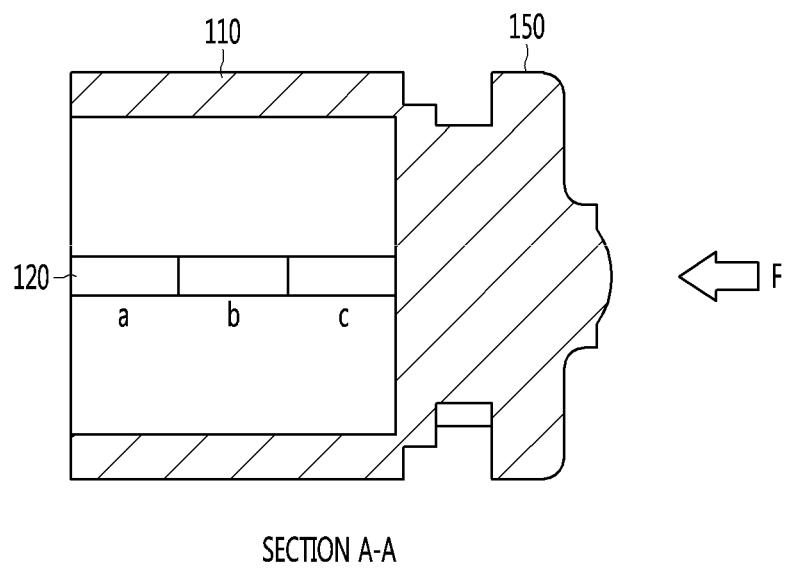
FIG. 3 shows a cross-sectional view of an electro-vibrating device according to one embodiment of the present disclosure.

FIG. 3 shows a cross-sectional view of an electro-vibrating device according to one embodiment of the present disclosure.

FIG. 3 is a cross-sectional view taken along a line A-A' in FIG. 2.

As shown in FIG. 3, an electro-vibrating device 100 according to an embodiment of the present disclosure has the rotation unit 110 mounted to one end of the frame 150 and around the frame 150. The electro-vibrating panel 120 is defined on the inner face of the rotation unit 110. As described above, the electro-vibrating panel 120 may be zoned in one or more zones a, b and c in FIG. 3.

In this connection, since the electro-vibrating panel 120 needs to apply different stimuli to the user's fingers at the same time, the electro-vibrating panel 120 may be divided in a direction perpendicular to a rotation direction of the rotation unit 110. In other words, the electro-vibrating panel 120 is divided into a plurality of zones in a direction in which the user's finger is inserted.

In one embodiment, the electro-vibrating panel 120 may be defined on the inner face of the rotation unit 110 in a band shape as shown in FIG. 3. The band may be divided into multiple zones a, b and c. In yet another embodiment, the electro-vibrating panel 120 may be formed on the entire inner face of the rotation unit 110. In both the embodiments, the electro-vibrating panel 120 may be zoned into multiple zones to generate different electro-vibrating patterns on the multiple zones.

Figure 4:
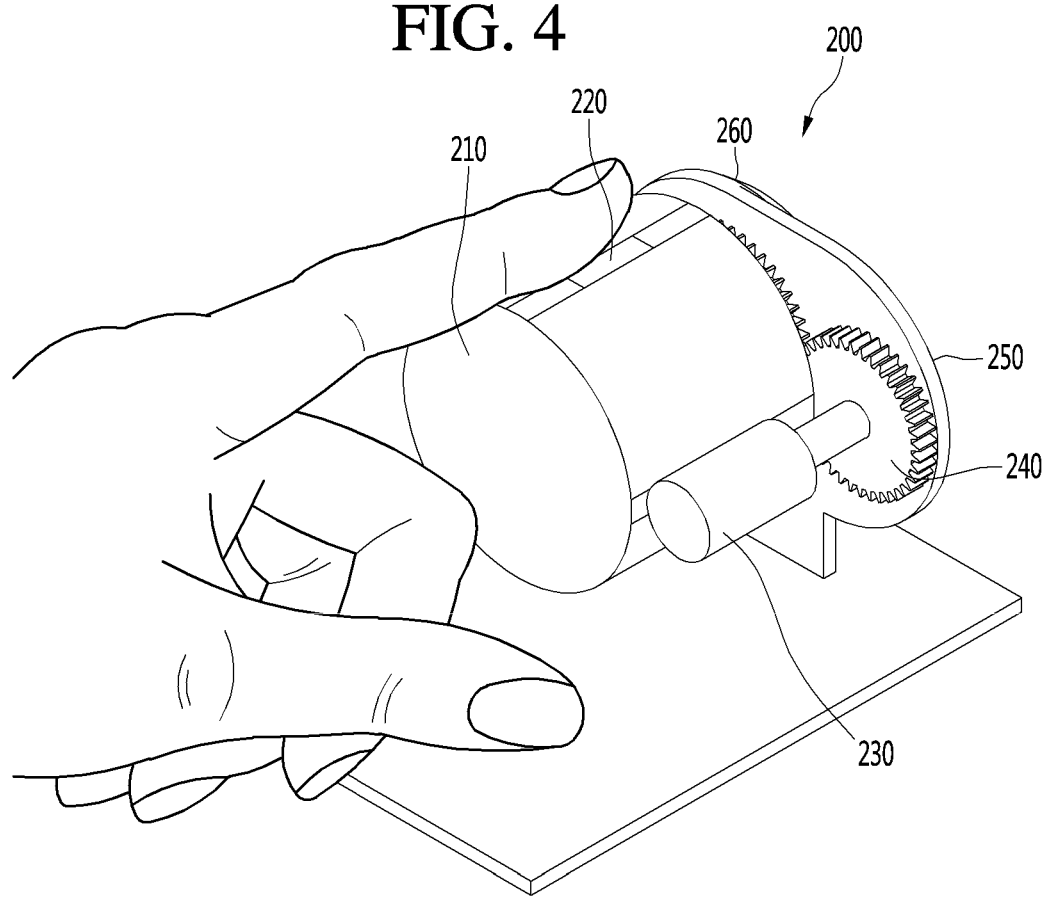
FIG. 4 shows an electro-vibrating device according to another embodiment of the present disclosure.

FIG. 4 shows an electro-vibrating device according to another embodiment of the present disclosure.

As shown in FIG. 4, an electro-vibrating 200 according to another embodiment of the present disclosure includes a rotation unit 210, an electro-vibrating panel 220, a motor 230, a power transmission 240, a frame 250, and a camera 260. In this connection, each component is the same configuration as that described with reference to the embodiment of FIG. 1. Following descriptions will focus on differences therebetween.

In the electro-vibrating device 200 shown in FIG. 4, the electro-vibrating panel 220 is defined on an outer face of the rotation unit 210, unlike the electro-vibrating panel 120 described above. As shown in FIG. 1, in the electro-vibrating device 100 according to the embodiment of FIG. 1, the electro-vibrating panel 120 is formed on the inner face of the hollow rotation unit 210. However, as shown in FIG. 4, in the electro-vibrating device 200 according to the embodiment of FIG. 4, the electro-vibrating panel 220 is formed on the outer face of the non-hollow rotation unit 210. Accordingly, in the embodiment of FIG. 4, when the user puts the fingers on the outer face of the rotation unit 210 which is rotating, the electro-vibrating panel 220 formed on the outer face of the rotation unit 210 applies a continuous stimulus to the fingers. In the embodiment of FIG. 4, unlike the embodiment of FIG. 1, there is an advantage that the rotating cylinder may be relatively small.

In the electro-vibrating device 200 according to another embodiment of the present disclosure, the electro-vibrating panel 220 on the outer face of the rotation unit 210 rotates while the rotation unit 210 rotates. Thus, the electro-vibrating device 200 may apply the continuous electro-vibrating stimulus to the user without requiring moving the user's fingers.

The electro-vibrating panel 220 of the electro-vibrating device 200 according to another embodiment of the present disclosure 220 may be zoned into multiple zones. The multiple zones produces different electro-vibrating patterns. Further, in FIG. 4, the electro-vibrating panel 220 is defined on a portion of the outer face of the rotation unit 210. Alternatively, the entire outer face of the rotation unit 21 may be anodized to form the electro-vibrating panel 220.

Figure 5:
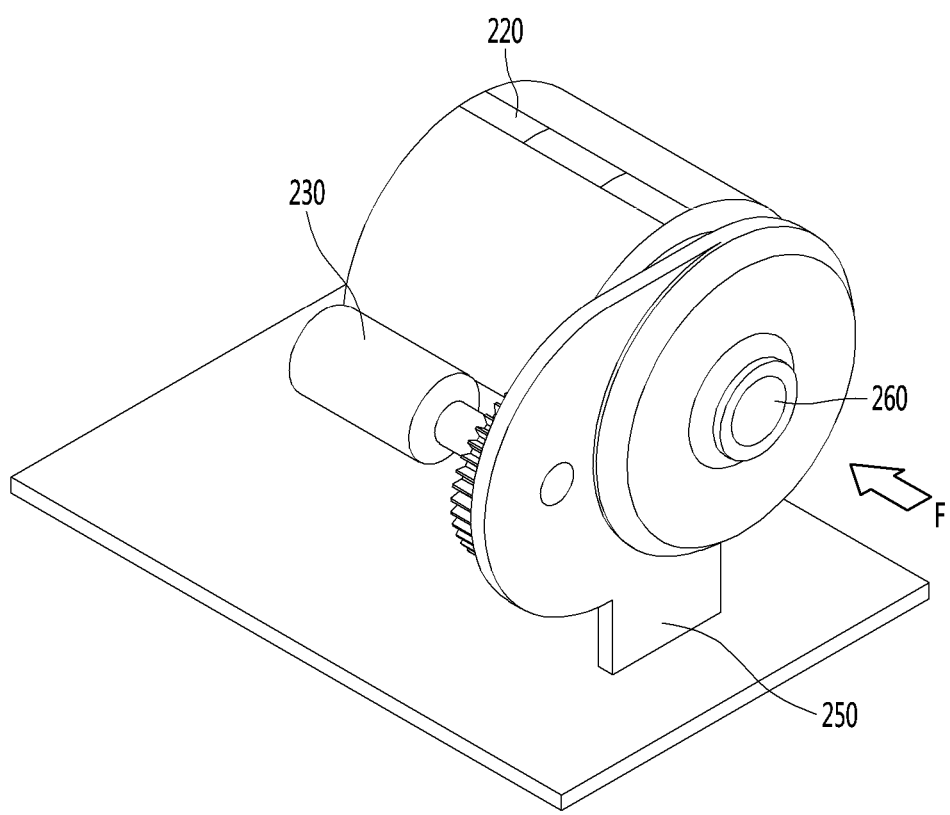
FIG. 5 is a front perspective view of the electro-vibrating device according to the embodiment of FIG. 4.

FIG. 5 is a front perspective view of an electro-vibrating device according to the embodiment of FIG. 4.

As shown in FIG. 5, the electro-vibrating device 200 according to another embodiment of the present disclosure has the camera 260 on the front face of the rotation unit 210.

The electro-vibrating device according to an embodiment of the present disclosure may further include a short-range or near field wireless communication device. The near field wireless communication device may be based on one of Bluetooth, Wi-Fi, NFC (Near Field Communication), and ZigBee.

According to an embodiment of the present disclosure, the electro-vibrating device acquires information using the short-range wireless communication device rather than using the camera. The acquired information may be transmitted to the controller to generate an electro-vibrating signal corresponding thereto.

In one example, the electro-vibrating device may be a component of a wearable device. In this case, the electro-vibrating device may acquire information for the wearer using the short-range communication from a main terminal device. Then, the electro-vibrating device may generate an electro-vibrating signal corresponding to the acquired information.

As used herein, the information that the electro-vibrating device acquires may include, for example, information about content, information about a road situation for the visually impaired person, information about an inner space for the visually impaired person or map information.

Further, the electro-vibrating panel may not only present information acquired using the camera or short-range wireless communication device in a braille form, but may also render an image corresponding to the information. Specifically, the electro-vibrating panel may be divided into a plurality of zones which may generate different stimuli to provide the user with tactile sensations for rendering the image.

Further, the rotating cylinder may physically translate to apply clearer tactile sensations for rendering the image. Specifically, the rotating cylinder may translate along with the rotation, to present a thickness of the rendered image that the electro-vibrating panel is presenting.

As used herein, the term "controller" may be used interchangeably with a term "microprocessor" and "processor".

The detailed description is not to be construed in a limiting sense in all respects but is to be regarded as illustrative. The scope of the present disclosure shall be determined by rational interpretation of the appended claims. All changes within the equivalent range of the present disclosure are included in the scope of the present disclosure.

What is claimed is:

1. A braille device comprising: a motor for generating rotational power; a rotation unit rotated by the rotational power generated by the motor and provided in a shape of a cylinder; and a smooth cylindrical panel, on a cylindrical face of the rotation unit, configured to simultaneously deliver a plurality of electrical stimuli to a finger of a user on the smooth cylindrical panel.

2. The braille device of claim 1, wherein the smooth cylindrical panel is divided into a plurality of zones, wherein the plurality of zones independently provide a respective electrical stimuli of the plurality of electrical stimuli to the finger of the user.

3. The braille device of claim 2, wherein an inside of the rotation unit has a shape of a cylinder and is hollow, wherein the smooth cylindrical panel is defined on an inner face of the rotation unit.

4. The braille device of claim 3, wherein the smooth cylindrical panel is defined on a portion of the inner face of the rotation unit.

5. The braille device of claim 3, wherein the smooth cylindrical panel is defined on an entirety of the inner face of the rotation unit.

6. The braille device of claim 2, wherein the smooth cylindrical panel is defined on an outer face of the rotation unit.

7. The braille device of claim 6, wherein the smooth cylindrical panel is defined on a portion of the outer face of the rotation unit.

8. The braille device of claim 6, wherein the smooth cylindrical panel is defined on an entirety of the outer face of the rotation unit.

9. The braille device of claim 1, wherein the rotation unit is configured to translate along a rotation axis in a predetermined direction, with rotation of the rotation unit.

10. The braille device of claim 1, wherein the braille device is connected to a wearable device or smartphone.

11. The braille device of claim 1, wherein the braille device further comprises: a camera disposed on a front face of the braille device for capturing an image; and a controller configured for generating an electrical signal based on the captured image.

12. The braille device of claim 11, wherein the controller is further configured for generating the electrical signal for presenting braille corresponding to a text included in the captured image.

13. The braille device of claim 11, wherein the camera is configured for capturing an image of a scene in front of the user, wherein the controller is further configured for generating the electrical signal for presenting braille corresponding to a text describing the image of the scene.

14. The braille device of claim 11, wherein the front face of the braille device is disposed in a direction opposite to a direction in which the finger of the user is inserted into the braille device.

15. The braille device of claim 2, wherein the smooth cylindrical panel is divided in a direction perpendicular to a rotating direction of the rotation unit.

16. The braille device of claim 1, wherein the braille device further comprises: a short range wireless communication device; and a controller configured for generating an electrical signal corresponding to information received via the short-range wireless communication device.

17. The braille device of claim 16, wherein the received information includes at least one of information on a situation of a road on which the user walks currently, information about an inner space in which the user is present currently, or map information.

* * * * *